(12) United States Patent
Zortea et al.

(10) Patent No.: US 7,936,835 B1
(45) Date of Patent: May 3, 2011

(54) ADAPTIVE SIGNAL DECOMPRESSION

(75) Inventors: Anthony Eugene Zortea, Pipersville, PA (US); Graeme Barclay Boyd, North Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 888 days.

(21) Appl. No.: 11/777,819

(22) Filed: Jul. 13, 2007

Related U.S. Application Data (60) Provisional application No. 60/830,836, filed on Jul. 14, 2006.

(51) Int. Cl.
*H04K 1/10* (2006.01)
*H04L 27/28* (2006.01)
*H04L 27/00* (2006.01)

(52) U.S. Cl. ........................................ 375/260; 375/259

(58) Field of Classification Search .................... 375/260
See application file for complete search history.

(56) References Cited

U.S. PATENT DOCUMENTS

| | | | |
|---|---|---|---|
| 4,811,097 A | 3/1989 | Ritter et al. | |
| 6,798,843 B1 | 9/2004 | Wright et al. | |
| 6,940,916 B1 | 9/2005 | Warner et al. | |
| 6,973,138 B1 | 12/2005 | Wright | |
| 7,349,574 B1* | 3/2008 | Sodini et al. ................. | 382/168 |
| 2003/0031269 A1* | 2/2003 | Verbin .......................... | 375/295 |
| 2003/0067990 A1* | 4/2003 | Bryant .......................... | 375/259 |
| 2005/0084150 A1* | 4/2005 | Shan et al. .................... | 382/166 |
| 2005/0100120 A1* | 5/2005 | Barton et al. ................. | 375/347 |
| 2007/0025465 A1* | 2/2007 | Richards ....................... | 375/271 |
| 2007/0155335 A1* | 7/2007 | Love et al. .................... | 455/69 |
| 2007/0230598 A1* | 10/2007 | Wang ............................ | 375/260 |

FOREIGN PATENT DOCUMENTS

WO  WO03081870  10/2003

OTHER PUBLICATIONS

Roy Batruni; Nonlinear Distortion Correction in Comms Channel Paths; Mar. 29, 2006; Planet Analog. [Retrieved on Jul. 9, 2007]. Retrieved from the Internet: <URL: www.planetanalog.com/showArticle?articleID=184401106>.

* cited by examiner

*Primary Examiner* — David C Payne
*Assistant Examiner* — Erin M File
(74) *Attorney, Agent, or Firm* — Knobbe Martens Olson & Bear LLP (57) ABSTRACT

The adverse effects of RF and baseband circuits are mitigated using a post-compensation method wherein a transfer function that would un-distort or complement a distorted waveform is parameterized to a relatively small number of degrees of freedom; and the parameters are estimated in a feedback loop. The error function of the feedback loop is generated by comparing some relatively low-order statistics that are known a priori or can be computed with relative certainty from the decided output waveform—to the statistics of the corrected signal.

14 Claims, 5 Drawing Sheets

ADAPTIVE SIGNAL DECOMPRESSION

CROSS-REFERENCE TO RELATED APPLICATIONS

This application claims the benefit under 35 U.S.C. §119(e) of U.S. Provisional Application No. 60/830,836, filed Jul. 14, 2006, the disclosure of which is hereby incorporated by reference.

BACKGROUND OF THE INVENTION

1. Field of the Invention

The invention generally relates to data communication channels with a varying peak-to-average power ratio, and in particular, to radio frequency (RF) or wireless transmissions in which peak-to-average ratio makes linearity challenging.

2. Description of the Related Art

In a data communication system, there are typically 3 sources of imperfection: (1) Band-limited channel; (2) Noise; and (3) Distortion. The first, "band-limited channel," is typically the result of parasitic impedances that reduce the bandwidth of the channel. Linear equalizers and the like are usually used to correct this imperfection. The second, "noise," is the result of random processes in the circuit and channel. This imperfection is typically tolerated rather than corrected. The third, "distortion," is the result of amplifier/block nonlinearity. Typical non-linearities in a data communication signal processing system are caused by analog circuit blocks.

In a radio or RF front end, the following analog circuit blocks contribute to the overall nonlinearity of the system: (i) Low noise amplifier (LNA); (ii) Down Converter; (iii) variable gain amplifier (VGA); (iv) Filter; (v) Up Converter; (vi) Pre-Power Amplifier; (vii) Power Amplifier; and the like.

Typically, a nonlinearity is of a "compressing" nature, in which the small signal gain of the amplifier decreases as the input signal becomes larger. Nonlinearities in a TX-RX link of a data communications system can degrade the bit error rate (BER) performance of the system by, for example, introducing the following: (i) Harmonics (frequency components that are integer multiples of the input frequencies); (ii) Gain Compression (the decrease in small signal gain as the input signal becomes larger); (iii) Desensitization or blocking (weak signals experience a increasingly smaller gain in the presence of larger signals); (iv) Cross Modulation (an artifact whereby the modulation of an interferer is transferred to a weaker desired signal); and (v) Intermodulation (frequency components that are sums and differences of integer multiples of two or more sinusoidal inputs).

Many texts have been written on the effects of nonlinearity in RF systems, such as RF Microelectronics by Behzad Razavi. (See Section 2.1.1 in the first edition). A memory-less nonlinear system can be represented with the input-output relationship as shown in Equation 1.

$$y(t)=N[x(t)]=a_1 x(t)+a_2 x^2(t)+a_3 x^3(t)+ \quad \text{(Eq. 1)}$$

The functional N in Equation 1 represents the overall nonlinearity of the channel. The goal of most linearization techniques is to estimate the inverse function $N^{-1}$ that can be applied somewhere in the system to reduce the effects of the nonlinearity.

Most systems are both nonlinear and dynamic (the output depends on past values of the input). This fact can complicate the issue of linearization, but for the purposes of the analysis herein, dynamic affects are ignored. It will be shown that substantial improvements are still achieved with this simplification.

Many linearization techniques pre-distort the signal before an analog circuit introduces a nonlinearity such that the net effect is a relatively linear system. This concept is illustrated in Equation 2.

$$y(t)=N[\text{PRE}[x(t)]] \approx x(t);$$
$$\text{PRE}[\cdot] \approx N^{-1}[\cdot] \quad \text{(Eq. 2)}$$

It should be noted that a function that returns x(t) is typically not sought; but rather, βx(t), i.e., a scaled version of x(t), is sought. For simplicity, however, the scaling will be ignored. Embodiments of the invention use post-compensation in the manner shown by Equation 3.

$$y(t)=\text{POST}[N[x(t)]] \approx x(t);$$
$$\text{POST}[\cdot] \approx N^{-1}[\cdot] \quad \text{(Eq. 3)}$$

Estimating the Inverse Nonlinearity Functional, $N^{-1}[.]$

One of the difficulties with any linearization technique is estimating $N^{-1}[.]$, whether in the form PRE[.], or POST[.], because the original distorting nonlinearity, N[.], is unknown and changes with process, voltage, and temperature (known as "PVT"), and age. This task is further complicated by the earlier-mentioned problem of a system being both non-linear and dynamic.

A feedback system of some sort is usually established to determine $N^{-1}[.]$. A feedback system uses the computation of an error between the desired response and the actual response. This error can be explicit or implicit, and deterministic or noisy.

With explicit error, the error is calculated directly as the difference between the actual signal and the known desired signal. With implicit error, the desired signal may not be known directly but is inferred indirectly through some kind of indicator or the like.

It can also be the case that while the error can be computed, the computation produces error signal and noise (as will be shown below). It is sometimes more efficient to calculate an error if the included noise can be tolerated. The reader is referred to the classic text *Automatic Control Systems*, by Benjamin C. Kuo for details on feedback systems.

Current state of the art for linearization techniques can be broken into two categories: pre-distortion, and post-compensation. Examples of Pre-Distortion techniques can be found, for example, in the following: (i) U.S. Pat. No. 6,798,843 to Wright, et al.; (ii) U.S. Pat. No. 6,940,916 to Warner et al.; (iii) U.S. Pat. No. 6,973,138 to Wright, et al.; (iv) U.S. Pat. No. 4,811,097 to Ritter and Zortea; (v) International Publication WO03081870 by Huang Xinping, titled Adaptive Predistorter Based on the Probability Distribution Function of the Output Amplitude.

Examples of Post-Compensation techniques can be found, for example, in the following: U.S. Pat. No. 7,002,410 by Jeong, et al.; and *Nonlinear distortion correction in comms channel paths* by Batruni of Optichron, Planet Analog, 29, March 2006.

SUMMARY OF THE INVENTION

Embodiments of the invention mitigate the effects of nonlinearity. One embodiment of the invention linearizes the compression distortion introduced by both the transmitter and the receiver of a TX-RX radio link by application of a post-compensation, decompression technique, which can be implemented within a receiver.

The adverse effects of RF and baseband circuits are mitigated using a post-compensation method wherein a transfer function that would un-distort or complement a distorted waveform is parameterized to a relatively small number of degrees of freedom; and the parameters are estimated in a feedback loop. The error function of the feedback loop is generated by comparing some relatively low-order statistics that are known a priori or can be computed with relative certainty from the decided output waveform to the statistics of the corrected signal.

One embodiment is a method of decompressing a distorted signal, wherein the method comprises: converting an analog signal to a digital signal, wherein the analog signal is distorted via nonlinearities of at least one of a receiver or a transmitter of the analog signal; determining a peak-to-average power ratio (PAR), wherein the determined PAR is based on observations of the digital signal for one or more symbol periods; remapping the digital signal to generate a modified digital signal via a decompression function; and adaptively adjusting the decompression function based at least in part on an error between the determined PAR and an expected PAR.

One embodiment is an apparatus for decompressing a compressed signal, wherein the apparatus comprises: an analog to digital converter (ADC) for converting an analog signal to a digital signal, wherein the analog signal is compressed via nonlinearities of at least one of a receiver or a transmitter of the analog signal; a computation circuit configured to observe one or more symbol periods of the digital signal and to determine a peak-to-average power ratio (PAR); a remapping circuit configured to remap the digital signal to generate a modified digital signal via a decompression function; and an adaptive adjustment circuit configured to adaptively adjust the decompression function of the remapping circuit based at least in part on an error between the determined PAR and an expected PAR.

One embodiment is an apparatus comprising: an orthogonal frequency division multiplexing (OFDM) circuit configured to generate OFDM symbols of input data, wherein the OFDM circuit is further configured to generate a peak-to-average power (PAR) of a signal carrying the OFDM symbols and to embed the PAR information within the signal; and a power amplifier configured to amplify the signal carrying the OFDM symbols.

BRIEF DESCRIPTION OF THE DRAWINGS

These drawings and the associated description herein are provided to illustrate specific embodiments of the invention and are not intended to be limiting.

DETAILED DESCRIPTION OF THE PREFERRED EMBODIMENT

Figure 1:
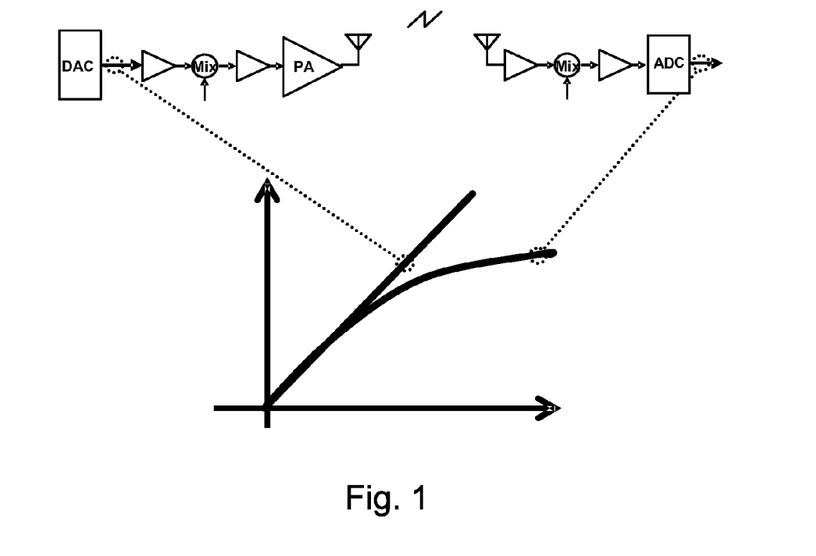
FIG. 1 illustrates nonlinearity in a typical signal processing system.
Figure 2:
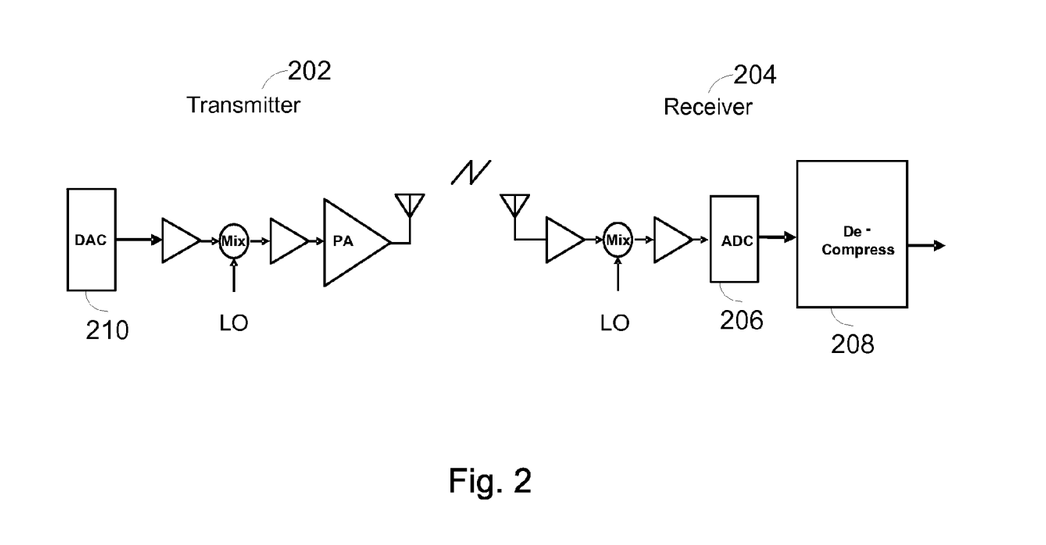
FIG. 2 illustrates an embodiment of Adaptive Radio Decompression.
Figure 3:
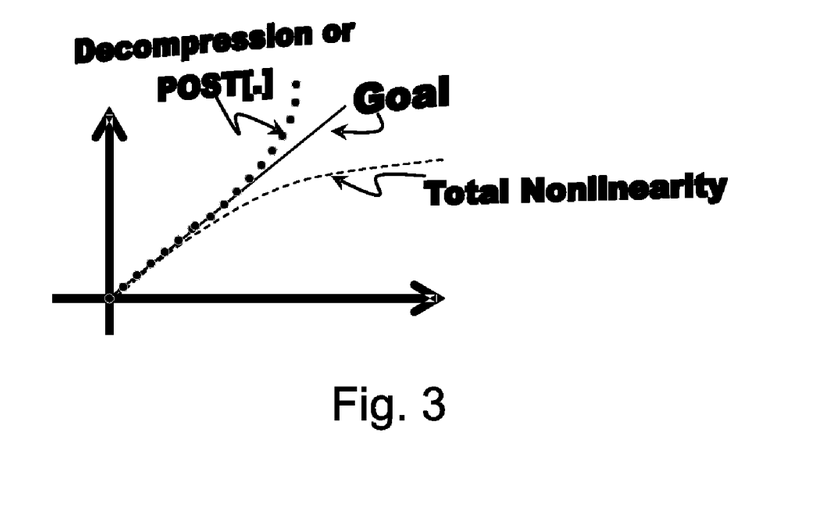
FIG. 3 illustrates an example of nonlinearity, a goal, and decompression in the context of Adaptive Radio Decompression.

Unlike conventional linearization schemes, which linearize either the TX or the RX, one embodiment of the invention linearizes the compression induced by both the transmitter 202 and the receiver 204 of a TX-RX radio link, by application of a post-compensation, decompression technique within the receiver 204, as described in connection with FIG. 2. This can save implementation cost as compensation circuitry within the receiver 204 alone can handle the distortion of compression from both the transmitter 202 and the receiver 204.

For the "decompression" feedback loop, an error is computed that is reduced or preferably driven to zero, and the signal coming out of the analog to digital converter (ADC) 206 is decompressed 208. One embodiment of the invention is used with orthogonal frequency-division multiplexing (OFDM). OFDM can be used in many applications and with many interface standards, such as, but not limited to, Wi-Fi (IEEE 802.11), WiMAX (IEEE 802.16), and the like. The distortion compensation techniques are typically embodied in a receiver front end.

The nonlinearity of a typical radio frequency (RF) receiver, as well as most other data communication links, is of a compressing nature. That is, the small signal gain of the system decreases as the input signal level increases.

Embodiments of the invention receive the output of the ADC 206 and remap the signal according to the remapping function POST(adc[n]), which can be implemented in the de-compress block 208. The remapping function POST[.] is an estimate of $N^{-1}[.]$, which is the true inverse of the channel nonlinearity.

Figure 4:
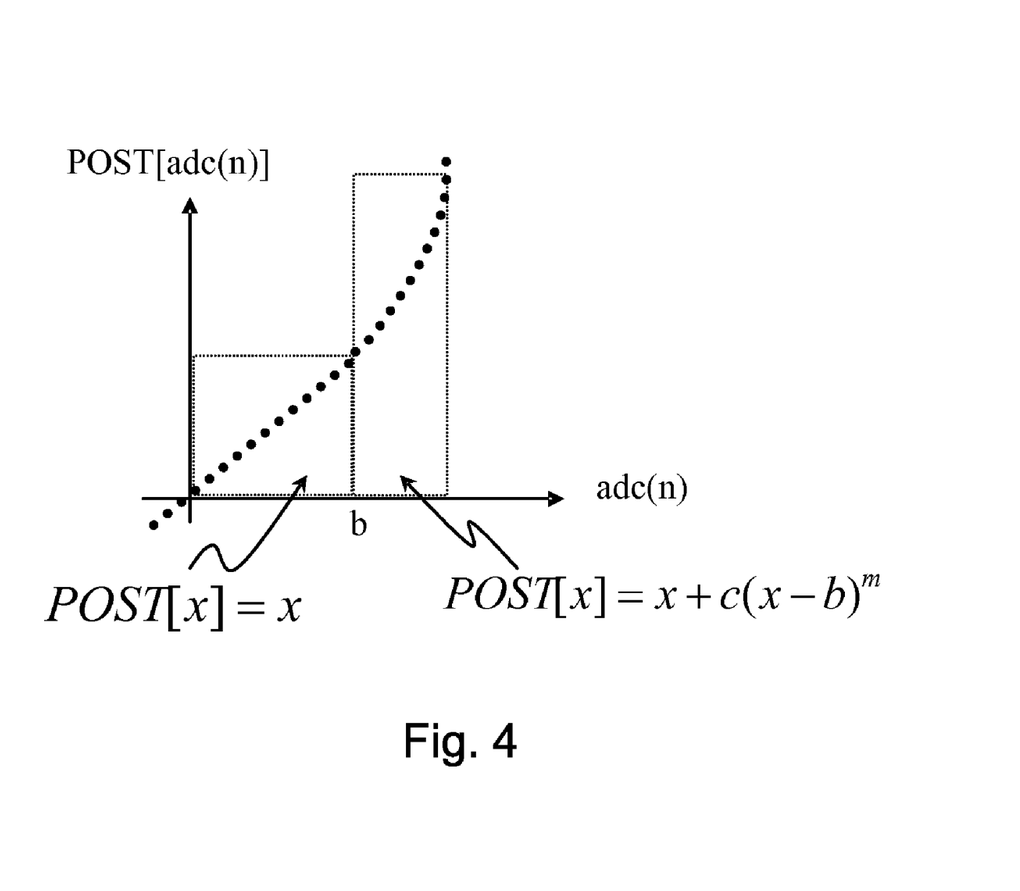
FIG. 4 illustrates an example of decompression remapping.

FIG. 4 illustrates an example of an implementation for the remapping function POST[.] in a receiver. While illustrated in the context of a relatively low order polynomial, the skilled artisan will appreciate that the principles and advantages described herein are applicable to higher order polynomials as well. As shown in FIG. 4, the remapping function POST[.] can be divided into two pieces:

$$POST[x]=x; x<b$$

$$POST[x]=x+c(x-b)^m; x \geq b \quad \text{(Eq. 4)}$$

In Equation 4, a relatively small number of parameters remain that are to be adjusted in a feedback loop: border b, coefficient c, and/or exponent m. Note that "p" (FIG. 7) can refer to one or more of the parameters in the set of b, c, and m. In one embodiment, the system fixes or predetermines b and m, and adjusts c in a feedback loop as will be described later in connection with FIG. 7. A broad range of values can apply, and these values can also scale with a range for x. In one example with a 10-bit system, the value of m is about 2.5, the value of b is around 100, and the value of c is around $20 \times 10^{-6}$. These values can be used for initialization of the process.

Of course, there are other functions that can implement the decompression. For example, the decompression function can be implemented with a lookup table, a multiplier, or the like. Other techniques will be readily determined by one of ordinary skill in the art.

Computing an Error

A feedback loop uses the computation of an error. One embodiment of the invention examines the statistics of the decompressed signal, and compares these statistics to reference values.

An example of one such statistic is the peak-to-average power ratio (PAR) of a signal. For example, in the case of orthogonal frequency-division multiplexing (OFDM) transmission, the E[PAR(OFDM)], i.e., the expected value of the PAR of an OFDM signal, is typically a function of the number n of OFDM symbols examined, i.e., $E_n[PAR]$.

$$E[PAR(OFDM)] = f(n); \text{ where} \quad \text{(Eq. 5)}$$

$$PAR(OFDM) = \frac{Peak_n(OFDM)}{RMS_n(OFDM)};$$

In Equation 5, $Peak_n$(OFDM) represents the peak PAR value over n OFDM symbols, and $RMS_n$(OFDM) represents the root mean square (RMS) PAR value over n OFDM symbols.

It is worth noting that the PAR as n→∞ (where n is the number of OFDM symbols included in the calculation) for most OFDM systems is a function of the number of subcarriers used, and has as an upper limit expressed by Equation 6.

$$PAR_{max}(OFDM) = 10 \text{ Log}_{10}(n\text{SubCarriers}) \quad \text{(Eq. 6)}$$

However, most systems use some form of scrambling that further reduces the upper limit expressed in Equation 6.

Figure 5:
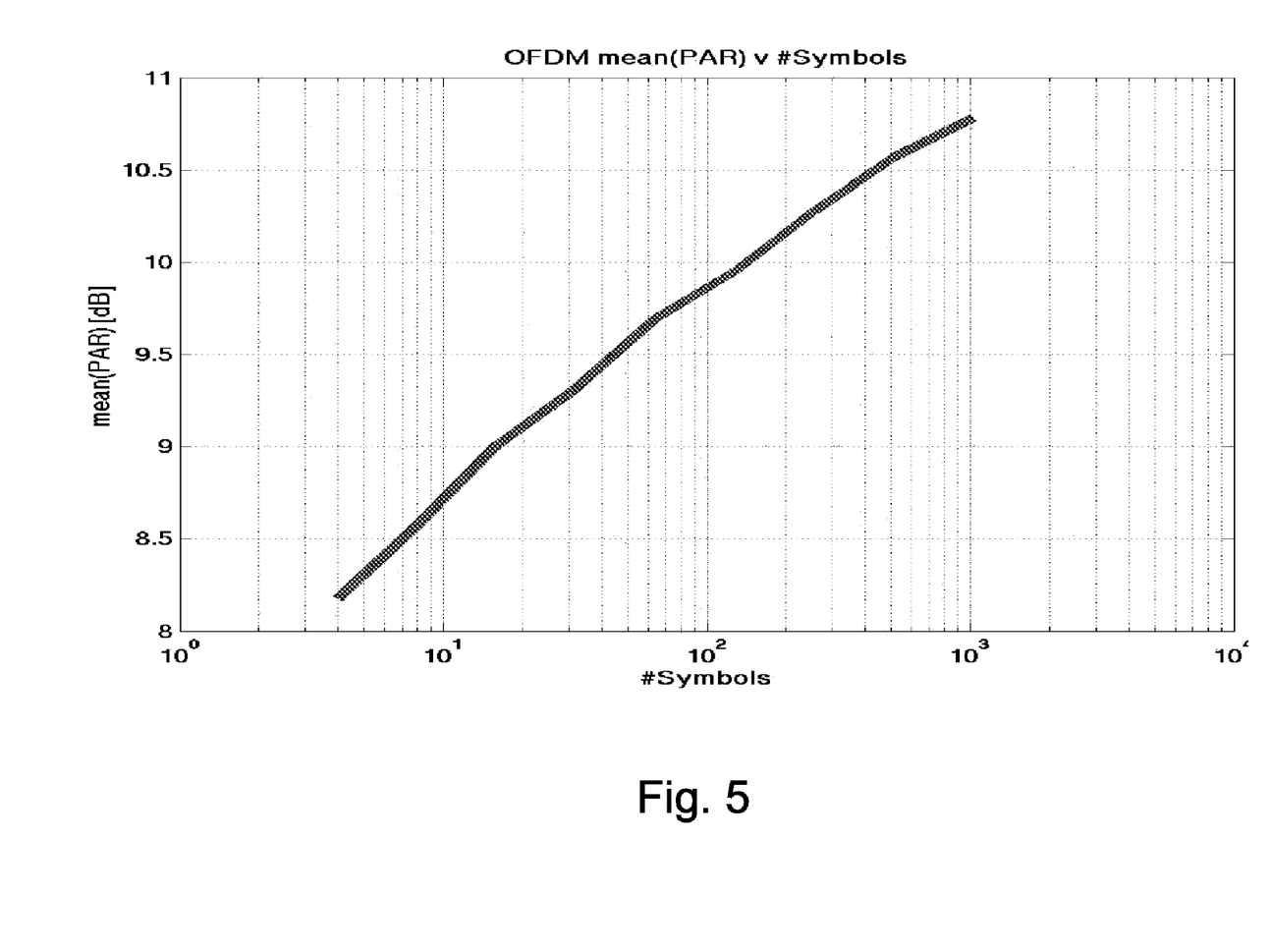
FIG. 5 illustrates an example of average PAR versus n OFDM symbols.

The average PAR can be computed as a function of the number of symbols and this number can be used as the reference in the error generation. An example of an average or mean PAR (vertical axis) versus a number n OFDM symbols (horizontal axis) is shown in FIG. 5. As illustrated in FIG. 5, the average or mean PAR of the signal carrying the symbols can be expected to vary over the number of symbols evaluated. In one embodiment, an expected value for PAR is based on the number of symbols evaluated, e.g., based on a predetermined number n of symbols such as 4, and a determined PAR, e.g., a measured PAR, based on the signal as received is compared to the expected PAR. The resulting error is then used as an input in an adaptive feedback loop to adjust one or more decompression parameters for improved linearity of the decompressed signal.

It should be noted that a single OFDM symbol itself typically encodes for a relatively large number of samples of data. For example, a single OFDM symbol can encode for 1000 samples of data, such as encountered with 10-bit encoding.

Figure 6:
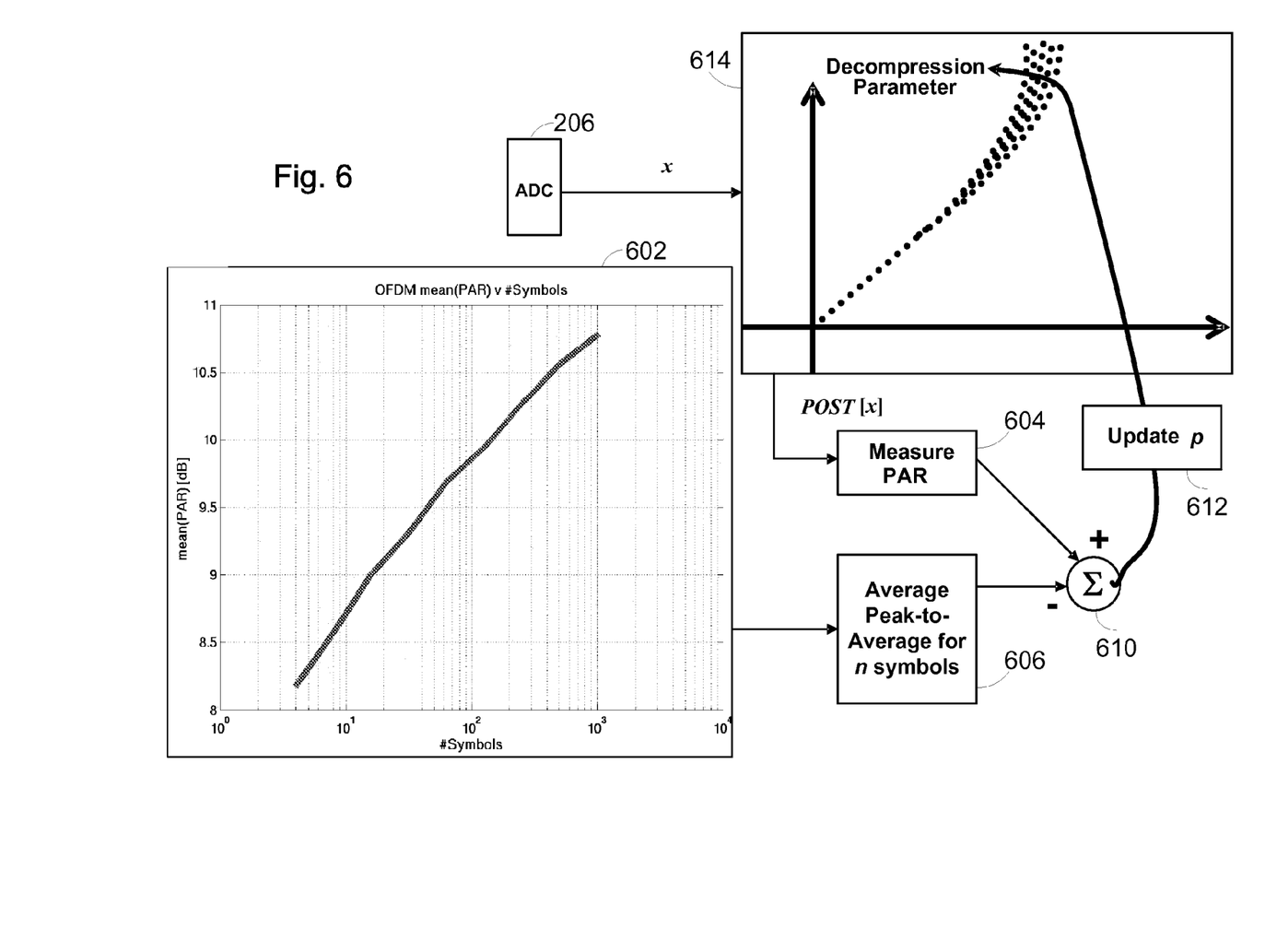
FIG. 6 illustrates another embodiment of Adaptive Radio Decompression.

One embodiment of the Adaptive Radio Decompression system is illustrated in FIG. 6. An output x of an Analog to Digital Converter (ADC) is provided as an input to a decompression function, represented by the curve to the upper right. An output POST[x] of the decompression function is provided as an input to a functional block for measuring the peak-to-average ratio (PAR), which measures the PAR of the output POST[x] over the applicable number n of symbols evaluated. The number of OFDM symbols evaluated at a time can vary in a broad range. In one example, the number n evaluated is 4 OFDM symbols. Other applicable values for n can be used and will be readily determined by one of ordinary skill in the art.

The PAR is determined by evaluating the symbols in the symbol range and using the equation for PAR expressed in Equation 5. For example, the peak value can correspond to the highest power value of the signals forming the symbols for the symbol range. The average can be determined by calculating an RMS power value of these signals.

The average PAR can be used as an expected PAR $E_n$[PAR] and is retrieved from, for example, a memory table 602. The memory table 602 is represented by the graph towards the lower left of FIG. 6. The number n of symbols evaluated at a time can be used as an index (horizontal axis) to look up an expected average PAR value. For example, with n equal to 4 symbols, the average PAR should be about 8.2 decibels (dB).

Figure 7:
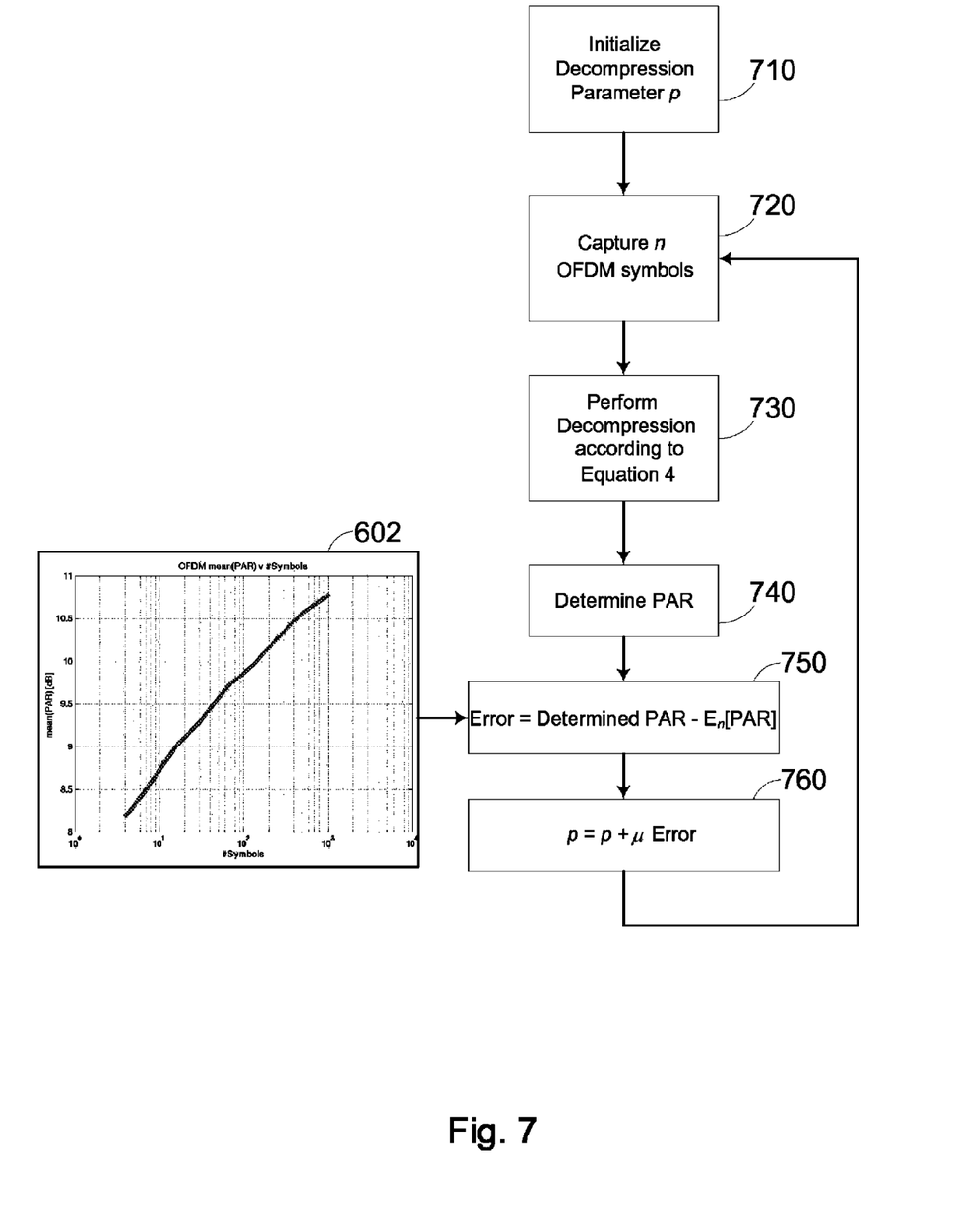
FIG. 7 is a flowchart that generally illustrates a process for adaptive radio decompression according to one embodiment of the invention.

The measured PAR 604 and the expected PAR 606 are compared as represented by the summation block 608 (the average PAR is inverted for the summation). The difference, or error, is then provided as an input to a block 612 for updating the parameter p (e.g., b, c, or m, FIG. 4) for adaptively updating the decompression function 614 as indicated by the block to the upper right. The decompression function 614 is implemented by, for example, the remapping function expressed in Equation 4. The decompression can reduce the effects of the nonlinearity of compression. For example, such decompression techniques can be used to improve the bit error rate (BER) of a compressed signal. An example of the process is also illustrated in the flowchart of FIG. 7. In one embodiment, the digital output x of the ADC 206 is used as an index for a lookup table that is updated with the decompression function 614, and the retrieved value stored in the lookup table (corresponding to an output of the decompression function) provides a decompressed digital output for decision circuitry, such as slicers.

FIG. 7 is a flowchart that generally illustrates a process for adaptive radio decompression according to one embodiment of the invention. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. In addition, portions of the process can be implemented by hardware, by software (including firmware), or by a combination of both hardware and software. The software can be executed by a microprocessor, microcontroller, signal processor, or the like.

The process begins by initializing 710 the decompression parameter p. The decompression parameter p represents the one or more parameters that are being adaptively adjusted. Of course, even parameters that stay fixed should be initialized.

The process then proceeds to capture (state 720) n OFDM symbols, e.g., capture data for n OFDM symbol periods from a signal carrying n OFDM symbols. In one embodiment, the value of n is predetermined, e.g., 4 OFDM symbols. The sample data for the n OFDM symbols can be retained, for example, in a memory device such as RAM. The process then proceeds to decompress 730 the received data according to the values of the parameters and the decompression function. For example, the decompression function described in connection with Equation 4 can be used.

The process then proceeds to determine 740 the peak-to-average power ratio (PAR) for the decompressed samples that make up the n OFDM symbols. The determined PAR is based on actual data. The determined PAR can be determined by, for example, application of Equation 5.

The process then proceeds to determine 750 an error between the determined PAR obtained in state 740 and an expected PAR $E_n$[PAR], such as from the memory table 602 (FIG. 6). In one embodiment, the determined PAR obtained in state 740 is filtered before it is used in the error computation. For example, the sample data can be filtered prior to the determination of the PAR. This can reduce incorrect adjustments due to interference and the like.

The process then proceeds to adjust 760 the one or more parameters p based on the determined error. For example, in one embodiment, the system holds parameters b and m fixed, and adaptively adjusts parameter c as p. The parameter μ accounts for the update rate of the feedback loop and will vary depending upon the frequency of update of the feedback loop. The process can then return from the adjustment state 760 to the capturing state 720 as appropriate for another adaptive adjustment of the parameters.

Many variations will be apparent to one of ordinary skill in the art. For example, instead of using an expected or average PAR, an actual PAR can be calculated (reconstructed) from the final digital OFDM symbols after the decision circuitry, such as, after slicing from soft symbols to hard symbols.

While illustrated above in the context of adjusting parameter c for parameter p, while keeping parameters b and m fixed, the principles and advantages described herein are applicable to the adjustment of the other parameters. For example, in one embodiment, for the adaptive adjustment of parameter p, parameter b (Equation 4) can be adjusted while parameters c (Equation 4) and m (Equation 4) remain fixed. In one embodiment, for the adaptive adjustment of parameter p, parameter m (Equation 4) can be adjusted while parameters b (Equation 4) and c (Equation 4) remain fixed. Combinations of these parameters can also be adaptively adjusted in the state 760 (FIG. 7). In one embodiment, when combinations of these parameters are used, the adjustments to the parameters in the state 760 should adjust the decompression monotonically with the vector index such that the error adjustment is stable for the vector defined by the adjusted parameters. In addition, higher order polynomials can be used, and these polynomials can have additional parameters for adaptive adjustment.

There is a class of advanced embodiments which can make use of the gain setting of variable gain receiver. The linearity of a receiver can vary with the gain setting of the variable gain stages of the receiver, and in one embodiment, the adaptively adjusted parameter can correspond to a gain setting for a variable gain amplifier (VGA). The feedback loop described in FIGS. 6 and 7 can adjust for nonlinearities that vary with the gain of a variable gain amplifier.

In one embodiment, rather than estimating the average PAR from the number of symbols received, the transmitter 202 (FIG. 2) provides the actual average PAR information to the receiver 204 (FIG. 2), which then reads and uses the actual average PAR information. Because the transmitter 202 transmits the actual OFDM symbols, the transmitter 202 can compute the actual average PAR information over selected OFDM symbols. For example, the actual average PAR information can be provided in a header or a payload of a data packet, which is then converted to analog by a DAC 210 (FIG. 2) and then transmitted. The PAR computation can be performed by, for example, an auxiliary circuit within an OFDM multiplexer. In addition, an indication of the n symbols over which the actual average PAR is calculated can also be transmitted.

An embodiment of the invention can reduce the cost or increase the performance of wireless or wireless physical layer (PHY) ICs. Furthermore, it allows a valuable design trade-off to be made: increase noise performance at the expense of linearity performance, since linearity can be compensated later.

Various embodiments have been described above. Although described with reference to these specific embodiments, the descriptions are intended to be illustrative and are not intended to be limiting. Various modifications and applications may occur to those skilled in the art.

What is claimed is:

1. A method of decompressing a distorted signal, the method comprising:
    converting an analog signal to a digital signal, wherein the analog signal is distorted via nonlinearities of at least one of a receiver or a transmitter of the analog signal;
    determining a peak-to-average power ratio (PAR), wherein the determined PAR is based on observations of the digital signal for one or more symbol periods;
    remapping the digital signal to generate a modified digital signal via a decompression function;
    adaptively adjusting the decompression function based at least in part on an error between the determined PAR and an expected PAR;
    extracting embedded symbols from the modified digital signal; and
    generating a value for the expected PAR based on the extracted embedded symbols.

2. The method of claim 1, wherein a value for the expected PAR is generated based at least in part on how many symbol periods are observed for the determined PAR.

3. The method of claim 1, wherein determining the peak-to-average power ratio (PAR) comprises determining the PAR for a predetermined number of symbol periods, and wherein the expected PAR is based at least in part on the predetermined number.

4. The method of claim 1, wherein adaptively adjusting the decompression function comprises adaptively adjusting a gain of a variable gain amplifier.

5. A method of decompressing a distorted signal, the method comprising:
    converting an analog signal to a digital signal, wherein the analog signal is distorted via nonlinearities of at least one of a receiver or a transmitter of the analog signal;
    determining a peak-to-average power ratio (PAR), wherein the determined PAR is based on observations of the digital signal for one or more symbol periods;
    remapping the digital signal to generate a modified digital signal via a decompression function;
    adaptively adjusting the decompression function based at least in part on an error between the determined PAR and an expected PAR;
    embedding an indication of the expected PAR within data of a transmitted signal, which is later received as the analog signal; and
    retrieving the embedded expected PAR for the expected PAR.

6. The method of claim 5, wherein remapping comprises maintaining a lookup table that holds the decompression function, and wherein adaptively adjusting comprises updating the lookup table.

7. The method of claim 5, wherein the analog signal is modulated with symbols via orthogonal frequency division multiplexing (OFDM).

8. A method of decompressing a distorted signal, the method comprising:
    converting an analog signal to a digital signal, wherein the analog signal is distorted via nonlinearities of at least one of a receiver or a transmitter of the analog signal;
    determining a peak-to-average power ratio (PAR), wherein the determined PAR is based on observations of the digital signal for one or more symbol periods;
    remapping the digital signal to generate a modified digital signal via a decompression function, wherein the decompression function is of the form:

$POST[x]=x$; for $x<b$ $POST[x]=x+c(x-b)^m$; for $x \geq b$;

and
    adaptively adjusting the decompression function based at least in part on an error between the determined PAR and an expected PAR, wherein the decompression function corresponds to POST[x], and wherein at least one of coefficient c, exponent m, or border b, is adaptively adjusted.

9. An apparatus for decompressing a compressed signal, the apparatus comprising:

an analog to digital converter (ADC) for converting an analog signal to a digital signal, wherein the analog signal is compressed via nonlinearities of at least one of a receiver or a transmitter of the analog signal;

a computation circuit configured to observe one or more symbol periods of the digital signal and to determine a peak-to-average power ratio (PAR);

a remapping circuit configured to remap the digital signal to generate a modified digital signal via a decompression function;

an adaptive adjustment circuit configured to adaptively adjust the decompression function of the remapping circuit based at least in part on an error between the determined PAR and an expected PAR;

a decision circuit configured to extract embedded symbols from the modified digital signal; and a second computation circuit configured to generate a value for the expected PAR based on the extracted embedded symbols.

10. The apparatus of claim 9, further comprising a memory table, wherein a value for the expected PAR is retrieved from the memory table based at least in part on how many symbol periods are observed by the computation circuit for the determined PAR.

11. The apparatus of claim 9, wherein the analog signal is modulated with symbols via orthogonal frequency division multiplexing (OFDM), and wherein the apparatus is embodied in an OFDM receiver.

12. An apparatus for decompressing a compressed signal, the apparatus comprising:

an analog to digital converter (ADC) for converting an analog signal to a digital signal, wherein the analog signal is compressed via nonlinearities of at least one of a receiver or a transmitter of the analog signal;

a computation circuit configured to observe one or more symbol periods of the digital signal and to determine a peak-to-average power ratio (PAR);

a remapping circuit configured to remap the digital signal to generate a modified digital signal via a decompression function;

an adaptive adjustment circuit configured to adaptively adjust the decompression function of the remapping circuit based at least in part on an error between the determined PAR and an expected PAR; and a transmitter configured to embed an indication of a value for the expected PAR within data of a transmitted signal for later reception as the analog signal in a receiver, wherein the adaptive adjustment circuit is further configured to extract the value for the expected PAR.

13. The apparatus of claim 12, wherein the remapping circuit comprises a lookup table that holds the decompression function, and wherein the adaptive adjustment circuit is configured to update the lookup table.

14. An apparatus for decompressing a compressed signal, the apparatus comprising:

an analog to digital converter (ADC) for converting an analog signal to a digital signal, wherein the analog signal is compressed via nonlinearities of at least one of a receiver or a transmitter of the analog signal;

a computation circuit configured to observe one or more symbol periods of the digital signal and to determine a peak-to-average power ratio (PAR);

a remapping circuit configured to remap the digital signal to generate a modified digital signal via a decompression function, wherein the decompression function POST[x] is of the form:

$POST[x]=x$; for $x<b$ $POST[x]=x+c(x-b)^m$; for $x \geq b$;

and an adaptive adjustment circuit configured to adaptively adjust the decompression function of the remapping circuit based at least in part on an error between the determined PAR and an expected PAR, wherein the adaptive adjustment circuit is configured to adaptively adjust at least one of coefficient c, exponent m, or border b.

* * * * *